United States Patent
Speyer

(10) Patent No.: US 8,598,057 B1
(45) Date of Patent: Dec. 3, 2013

(54) MULTI-HIT UNITARY SEAMLESS, AND CONTINUOUS CERAMIC BALLISTIC BODY FOR ARMOR INCLUDING BODY ARMOR, VEHICLE ARMOR, AND AIRCRAFT ARMOR

(75) Inventor: Robert F. Speyer, Atlanta, GA (US)

(73) Assignee: Verco Materials, LLC, Atlanta, GA (US)

( * ) Notice: Subject to any disclaimer, the term of this patent is extended or adjusted under 35 U.S.C. 154(b) by 466 days.

(21) Appl. No.: 12/773,425

(22) Filed: May 4, 2010

Related U.S. Application Data

(60) Provisional application No. 61/175,190, filed on May 4, 2009.

(51) Int. Cl.
C04B 35/56 (2006.01)
C04B 35/577 (2006.01)
F41H 5/04 (2006.01)

(52) U.S. Cl.
USPC ............ 501/87; 501/89; 501/90; 501/91; 501/92; 428/701; 428/702; 89/36.02

(58) Field of Classification Search
USPC ............. 501/87, 88, 89, 90, 91, 92; 89/36.02; 428/701, 702
See application file for complete search history.

(56) References Cited

U.S. PATENT DOCUMENTS

| | | | | |
|---|---|---|---|---|
| 3,633,520 A | * | 1/1972 | Stiglich, Jr. | 109/82 |
| 4,195,066 A | * | 3/1980 | Schwetz et al. | 423/291 |
| 4,719,151 A | * | 1/1988 | Chyung et al. | 428/428 |
| 4,968,647 A | * | 11/1990 | Ownby | 501/99 |
| 5,505,899 A | * | 4/1996 | Sigl et al. | 264/29.7 |
| 7,550,401 B2 | * | 6/2009 | Nunn | 501/87 |
| 7,557,054 B2 | * | 7/2009 | Oda et al. | 501/90 |
| 7,584,669 B2 | * | 9/2009 | Dankert et al. | 73/788 |
| 7,751,067 B1 | * | 7/2010 | True et al. | 356/614 |
| 7,776,773 B2 | * | 8/2010 | Horiuchi et al. | 501/87 |
| 7,854,190 B2 | * | 12/2010 | Speyer | 89/36.02 |
| 7,919,040 B2 | * | 4/2011 | Pujari et al. | 264/669 |
| 8,101,535 B2 | * | 1/2012 | Carberry et al. | 501/62 |
| 2006/0052232 A1 | * | 3/2006 | Bretscher et al. | 501/133 |
| 2007/0203012 A1 | * | 8/2007 | Oda et al. | 501/87 |
| 2008/0227618 A1 | * | 9/2008 | Horiuchi et al. | 501/90 |
| 2008/0296798 A1 | * | 12/2008 | Nunn | 264/122 |
| 2010/0288113 A1 | * | 11/2010 | Speyer | 89/36.02 |
| 2011/0028301 A1 | * | 2/2011 | Vargas-Gonzalez et al. | 501/90 |
| 2011/0314997 A1 | * | 12/2011 | Carberry et al. | 89/36.02 |

FOREIGN PATENT DOCUMENTS

WO 2006110720 * 10/2006
WO 209138970 * 11/2009

* cited by examiner

Primary Examiner — Karl Group
(74) Attorney, Agent, or Firm — Ostrolenk Faber LLP

(57) ABSTRACT

A monolithic, unitary, seamless and physically continuous ceramic armor plate having first regions of one mechanical property and one chemical composition and one microstructural composition isolated from one another by a network of second regions of another mechanical property different from the one mechanical property and another chemical composition different from the one chemical composition and another microstructural composition different from the one microstructural composition, the one mechanical property and the another mechanical property being the propensity to crack.

10 Claims, 1 Drawing Sheet

MULTI-HIT UNITARY SEAMLESS, AND CONTINUOUS CERAMIC BALLISTIC BODY FOR ARMOR INCLUDING BODY ARMOR, VEHICLE ARMOR, AND AIRCRAFT ARMOR

CROSS-REFERENCE TO RELATED APPLICATION

This application is based on and claims benefit of U.S. Provisional Application Ser. No. 61/175,190, filed May 4, 2009, entitled IMPROVED MULTI-HIT UNITARY, SEAMLESS, AND CONTINUOUS CERAMIC BALLISTIC BODY FOR ARMOR INCLUDING BODY ARMOR, VEHICLE ARMOR, AND AIRCRAFT ARMOR, to which a claim of priority is hereby made and the disclosure of which is incorporated by reference.

BACKGROUND AND SUMMARY OF THE INVENTION

Ceramic ballistic plates having a unitary (i.e. a single piece) configuration are known. Such unitary ceramic ballistic plates are comprised entirely of the same ceramic material composition, and thus exhibit the same bulk mechanical properties throughout the body thereof.

In a typical application, unitary (i.e. single piece) ceramic ballistic plates backed by a polymer fiber and resin composite are inserted into respective pockets located, for example, in the front and the back of a flack jacket to provide protection for the body's most vital organs from high power and high speed projectiles such as armor-piercing rounds. Other than a human body, ceramic ballistic plates can be used to protect other bodies, for example, a vehicle, aircraft, or building structure.

It is known that the ballistic stopping power of a unitary ceramic ballistic plate can be severely degraded after being stricken by a projectile, not only at the point of impact, but also at locations relatively farther away from the point of impact because of cracks that propagate and extend away from the point of impact through the body of the unitary ceramic ballistic plate. The reason for the possibility of the body-wide crack propagation is that the plate is made entirely of the same brittle material composition with the same bulk mechanical properties throughout the body thereof, including properties that relate to the response of the material to crack propagation.

Efforts are currently being undertaken to develop a standard ESAPI (enhanced small arms protective insert) plate with multiple segments (each segment being a discreet unitary body of a ceramic ballistic material) fitted together to make up the overall shape of a standard single unitary ceramic ballistic plate. By using multiple segments, the advancement of cracks created by the impact of a projectile can be restricted to the boundary of the segment receiving the impact in that an advancing crack cannot travel beyond the edge of a segment to another segment within the multi-segment ceramic ballistic body. As a result, compared to a unitary ceramic ballistic plate that is made entirely of the same ceramic material, a multi-segment ceramic ballistic plate, that has been stricken by a projectile, is expected to exhibit a lesser degradation of its overall ability to resist damage by subsequent projectiles.

A drawback to a multi-segment ceramic ballistic plate, however, is the presence of seams between the segments. Seams, which are physical discontinuities in a multi-segment ceramic ballistic plate, render severe inconsistency in the ballistic stopping power of a multi-segment plate in that the seams have little to no ballistic stopping capability.

Thus, it is desirable to have a unitary, seamless, and physically continuous ceramic ballistic plate that does not exhibit the disadvantages of the unitary ceramic ballistic plates of the prior art and/or the disadvantages of a multi-segment ceramic ballistic plate.

An armor plate according to the present invention is a monolithic, unitary, seamless and physically continuous ceramic body having first regions of one mechanical property, one chemical composition, and one microstructural composition isolated from one another by a network of second regions of another mechanical property different from the one mechanical property; another chemical composition, and another microstructural composition, the one mechanical property and the another mechanical property being the propensity to propagate or arrest a crack.

In one embodiment, the first regions have a lesser propensity to branch cracks than the second regions, while in another embodiment the first regions have a higher propensity to branch cracks than the second regions.

An armor plate according to the present invention may be comprised of a base ceramic material such as boron carbide or silicon carbide in which the first and second regions have different chemical compositions and/or microstructural make up (composition). For example, the base ceramic may be silicon carbide, the first regions may have low to no graphite content while the second regions may have a higher graphite content, e.g. more than 2.5% by weight and up to 25% by weight of graphite. Alternatively, the base ceramic may be silicon carbide with no or little secondary phases in the first regions thereof, while the second regions include grain boundary phases containing yttrium and aluminum oxides to weaken the second regions. When the base ceramic is boron carbide, the first regions may include little to no graphite, while the second regions may include a larger amount of graphite in order to enhance its propensity to branch and capture cracks.

Other features and advantages of the present invention will become apparent from the following description of the invention which refers to the accompanying drawings.

DETAILED DESCRIPTION

Figure 1:
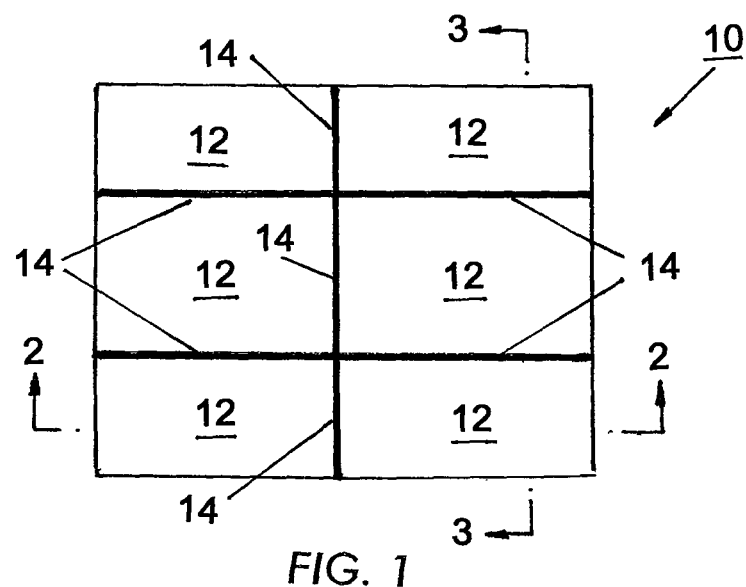
FIG. 1 schematically illustrates a unitary, seamless, and physically continuous ceramic ballistic plate according to the present invention.

FIG. 1 schematically illustrates an embodiment of a sintered, monolithic, unitary (i.e. single piece), seamless and physically continuous (i.e. lacking a physical discontinuity such as a seam) ceramic ballistic plate 10 according to the present invention. Thus, a plate 10 according to the present invention is a unitary and seamless body made of a ceramic such as boron carbide or silicon carbide that has been sintered to high relative density to stop a high power, high speed projectile. For example, for ESAPI, the plate can be configured to stop a projectile that is 7.62×63 mm, 162 grain, APM2 (steel core), having a velocity of 2900 ft/s, or, for XSAPI, a projectile that is 7.62×71 mm (tungsten carbide core) having a velocity of 2900 ft/s. Preferably, the size of a standard unitary ceramic ballistic plate according to the present invention meets a standard for a ceramic ballistic plate as required, for example, by U.S. Military ESAPI and XSAPI specifications, or NIJ level 4 specifications. It should be noted, however, that a plate according to the present invention can be any shape or size and need not be used in a flack jacket, but can be used to protect other bodies such as a car, helicopter, a building or the like inanimate bodies.

Referring first to FIG. 1, according to an aspect of the present invention plate 10 is a monolithic, unitary, seamless, and physically continuous body that includes a plurality of regions 12 having one set of ballistic characteristics that are separated and isolated from one another by a network of interconnected regions 14 having another set of ballistic characteristics intentionally configured to prevent the propagation of cracks generated by the impact of a projectile in one region 12 from traveling to another region 12 of plate 10. Specifically, regions 12 have a propensity to crack that is different from the propensity to crack of regions 14. Regions 14 are preferably not readily visibly distinct to the human eye and will be approximately 1 to 5 mm wide.

Figure 2:
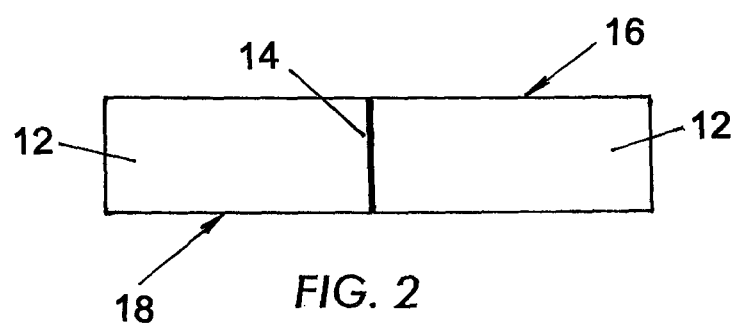
FIG. 2 illustrates a cross-sectional view of the plate in FIG. 1 along line 2-2 viewed in the direction of the arrows.
Figure 3:
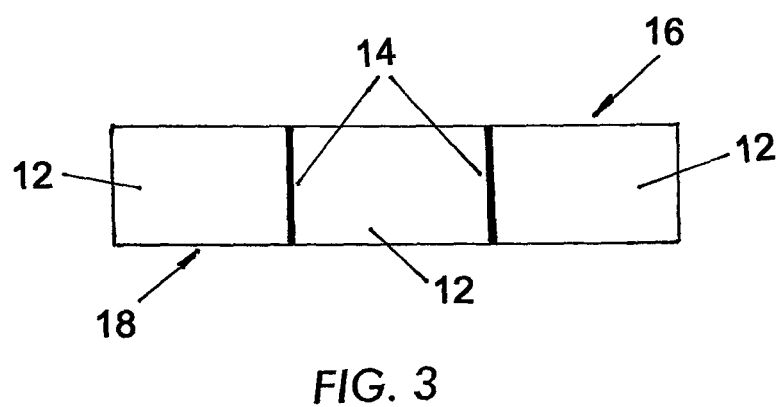
FIG. 3 illustrates a cross-sectional view of the plate in FIG. 1 along line 3-3 viewed in the direction of the arrows.

Thus, as illustrated by FIGS. 1, 2, and 3 each region 12 is separated and isolated by regions 14 from other regions 12, whereby a crack in one region 12 is prevented from traveling to another region 12 no matter which direction the crack happens to travel. Furthermore, as illustrated by FIGS. 2 and 3 each region 14 extends fully through the thickness of the body of plate 10. That is, each region 14 extends from one surface 16 (which may be the strike face of plate 10 designated to face the initial impact of the projectile) to back face 18 which is opposite the strike face 16 (which may be the surface facing the body of the person wearing the flack jacket or any other area of an inanimate body that is to be protected from the projectile).

Note that in the preferred embodiment, regions 14 are configured to have a lesser ability to withstand cracking (i.e. a higher propensity to crack) relative to the ability of regions 12 so that a crack originating from one region 12 can cause cracking therein with greater ease than it could in region 12. As a result, a crack originating in one region 12 dissipates its energy by cracking and traveling along a region 14, whereby crack propagation from one region 12 to another region 12 can be hindered.

According to an aspect of the present invention, regions 14 can be configured to have a greater ballistic stopping capability than, for example, the seams in a multi-segment ceramic ballistic plate. As a result, a plate according to the present invention, is a monolithic, unitary, seamless and physically continuous ceramic body that can restrict the propagation of cracks throughout the body thereof but allows for better ballistic stopping capability than a multi-segment ceramic ballistic plate in that is does not include physical discontinuities (seams) in its body.

It should be noted that while regions 14 can be configured to have a higher propensity to crack than regions 12, it may also be possible to configure regions 14 to have a lower propensity to crack, whereby a crack in one region 12 may be simply stopped once it reaches a region 14 thus hindering crack propagation from one region 12 to another region 12.

According to one preferred embodiment of the present invention, regions 12, and regions 14 in a unitary, seamless, and physically continuous body are comprised of the same base ceramic material that has been chemically configured (and/or microstructurally configured) to have different ballistic properties, namely, ballistic stopping power and resistance to cracking. For example, a plate according to the present invention may be made of silicon carbide or boron carbide as the base ceramic in which regions 12 and regions 14 have been configured to have different chemical compositions so that regions 12 will have a crack propensity that is different than the crack propensity of regions 14 so that a crack generated in one region 12 will not travel to or otherwise cause cracking in another region 12.

The following are some specific examples of a monolithic, unitary, seamless and physically continuous ceramic ballistic plate according to the present invention.

Typically, carbon is mixed in with a starting mass of SiC powder to facilitate its sintering by reacting away the amorphous silicon oxide coatings invariably present on the particle surfaces. Usually, a minimum of carbon is added (typically 2.5 wt %) for this purpose since residual graphite remaining in the microstructure weakens the sintered ceramic body.

In a plate according to the present invention, additional graphite will be added to the SiC powder before sintering in order to obtain SiC of higher graphite content (e.g. more than 2.5% by weight and up to 25% by weight of graphite) in regions that are to function as regions 14 in the sintered ceramic ballistic plate. Depending on the amount of added carbon, regions 14 will contain a higher graphite content after sintering, and, therefore, will be weakened anywhere from a slight to a substantial amount.

The same modifications could be made to a boron carbide ballistic plate. That is, regions that are to be configured to perform as regions 14 would receive a higher graphite (e.g. from 0% to 25% by weight of graphite) initial carbon additive so that, after sintering, the regions with the higher carbon content will have a higher graphite content. After sintering, the regions with a higher graphite content would be weaker mechanically and would have a higher propensity to crack compared to the rest of the plate and can serve as regions 14.

In another embodiment, aluminum oxide and yttrium oxide could be added to the starting SiC powder in the regions that are to become regions 14 in the sintered body, while regions that are to become regions 12 in the sintered body can be carbon-doped SiC. The regions containing aluminum oxide and yttrium oxide would sinter by a liquid phase sintering mechanism to form a microstructure with grains separated by a yttrium-aluminum-garnet interphase, or an amorphous interphase (facilitated by the silica on SiC particles). These interphase regions, which would correspond to regions 14, would be weak and facilitate intergranular fracture, thereby increasing the propensity of cracks extending into a region 14 from one region 12 to branch along and stay within the region 14 rather than continue into another region 12.

In each of the examples, by varying the concentration of the additives, regions 14 in the final sintered body would be adequately weak to arrest and blunt crack penetration from one region 12 to another region 12 in the sintered body. It should be noted that similar additives could be added to the rest of the SiC powder prior to sintering in order to obtain a liquid-phase-sintered SiC (using similar additives). In such a case, regions 14 would be distinguished by higher concentrations of additives.

Thus, in the preferred embodiments, the chemical composition and/or phase composition (microstructural configuration) of regions 14, which serve as crack arresting or blunting regions, can be configured to obtain a sintered, monolithic, unitary, seamless, and continuous ceramic plate according to the present invention.

To fabricate a plate according to the present invention, a pressing die cavity having an insert with thin channels defined by shaped thin aluminum, steel, or plastic guides can be used. Powder of armor material (e.g. powder of silicon carbide or boron carbide) is then poured into all locations outside of the channels, and then the powder composition that is to form regions 14 will be poured into the channels. The insert will then be gently removed, permitting minimal merging of the two powder compositions. A punch will then be pressed against the powder in the pressing die to obtain a single green body from the two powder compositions. Thereafter, the green body is sintered to obtain a plate according to the present invention.

It should be noted that while FIG. 1 shows a network of regions 14 that includes elongated regions that cross one another at a ninety degree angle, any network of regions 14 is considered to be within the scope and the spirit of the present invention. Thus, regions 14 may cross one another at different angles to define boundaries for regions 12 that are angularly spaced at more or less than ninety degrees. Furthermore, regions 14 need not be elongated lines, but may be any configuration including curved lines.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An armor body comprising: a monolithic, unitary, seamless and physically continuous ceramic plate having first regions of one mechanical property, one chemical composition, and one microstructural composition isolated from one another by a network of second regions of another mechanical property different from said one mechanical property, another chemical composition, and another microstructural composition, said one mechanical property and said another mechanical property being the propensity to crack, wherein said plate includes opposite, first and second exterior surfaces and said first regions and said second regions extend from said first exterior surface to said second exterior surface and wherein said second regions hinder crack propagation from one first region to another first region.

2. The armor body of claim 1, wherein said first regions have a lesser propensity to crack than said second regions.

3. The armor body of claim 1, wherein said first regions have a higher propensity to crack than said second regions.

4. The armor body of claim 1, wherein said body is comprised of SiC and said another chemical composition includes more than 2.5% by weight and up to 25% by weight of graphite.

5. The armor body of claim 1, wherein said body is comprised of SiC and said another chemical composition includes yttrium and aluminum oxides.

6. The armor body of claim 1, wherein said body is comprised of SiC and said another microstructure includes grains separated by a yttrium-aluminum-garnet interphase.

7. The armor body of claim 1, wherein said body is comprised of SiC and said another microstructure grains separated by an amorphous interphase.

8. The armor body of claim 1, wherein said ceramic plate is comprised of boron carbide.

9. The armor body of claim 1, wherein said ceramic plate is comprised of boron carbide and said first regions and said second regions include different amounts of graphite.

10. The armor body of claim 1, wherein said ceramic plate is comprised of boron carbide and said second regions include a higher graphite content than said first regions.

* * * * *